United States Patent
Bertin et al.

(10) Patent No.: US 8,219,449 B2
(45) Date of Patent: Jul. 10, 2012

(54) COMMUNICATION METHODS AND SYSTEMS

(75) Inventors: Olivier Bertin, Peymeinade Alpes-Maritimes (FR); Didier Desiderio, Le Cannet (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 12/270,342

(22) Filed: Nov. 13, 2008

(65) Prior Publication Data

US 2009/0132397 A1 May 21, 2009

(30) Foreign Application Priority Data

Nov. 15, 2007 (EP) .................................... 07301551

(51) Int. Cl.
*G06Q 20/00* (2006.01)
(52) U.S. Cl. ............ 705/16; 705/30; 455/406; 340/10.1
(58) Field of Classification Search ........................ None
See application file for complete search history.

(56) References Cited

U.S. PATENT DOCUMENTS

| | | | |
|---|---|---|---|
| 6,668,327 B1 * | 12/2003 | Prabandham et al. | 726/4 |
| 6,954,631 B2 * | 10/2005 | Thiebot | 455/406 |
| 7,194,550 B1 | 3/2007 | Chamdani et al. | |
| 2004/0139012 A1 * | 7/2004 | Koskinen et al. | 705/40 |
| 2005/0165756 A1 * | 7/2005 | Fehse | 707/3 |
| 2006/0031586 A1 | 2/2006 | Sethi et al. | |
| 2006/0193344 A1 * | 8/2006 | Nie et al. | 370/466 |
| 2007/0036312 A1 * | 2/2007 | Cai et al. | 379/126 |
| 2007/0252678 A1 * | 11/2007 | Garcia Alonso et al. | 340/10.31 |
| 2010/0248685 A1 * | 9/2010 | Li et al. | 455/406 |

OTHER PUBLICATIONS

European Patent Office, Extended European Search Report, Apr. 17, 2008, 6 pages.

* cited by examiner

*Primary Examiner* — Luna Champagne

(57) ABSTRACT

A system arranged to receive an authorization request from an application server using a first communication protocol; identify a charging server associated with the authorization request from a plurality of charging servers, each charging server associated with a respective charging server communication protocol; and communicate with the identified charging server using the respective charging server communication protocol.

25 Claims, 6 Drawing Sheets

COMMUNICATION METHODS AND SYSTEMS

This application claims priority from European Patent Application 07301551.3, filed on Nov. 15, 2007. The entire content of the aforementioned application is incorporated herein by reference.

BACKGROUND TO THE INVENTION

Telecommunication systems often provide multiple services or content to an end user. Examples of services include voice calls, video calls, messaging and other data services. A difficulty in providing such content and services is the large diversity of protocols supported by billing and charging systems operated by content/service providers. All applications and services on an application server must be able to interface with those various billing and charging systems to enable charging and billing users for use of the applications and services. This leads to complex and costly integration projects for adapting applications and services to the various billing and charging systems. In addition to cost, this can also significantly delay the availability of the application or service to the market, thus reducing service providers' revenues.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Embodiments of the invention relate to communication methods and systems. For example, embodiments of the invention relate to a telecommunication system where content or services are provided by one or more applications on an application sever. The content or services are supplied to a user agent (such as, for example, a mobile phone, laptop computer, PDA and the like) that is typically operated by an end user. Applications on the application server communicate with a plurality of charging servers via a charging gateway. The charging gateway presents a common (generic) interface to the applications such that the applications communicate with the charging gateway using a common protocol that is independent of the charging server currently being communicated with. The charging gateway implements the required communication protocol in communications with the charging server. Thus, applications need only be configured to use one interface and/or protocol, and may still communicate with a plurality of charging servers implementing a plurality of communication protocols. The charging servers do not need reconfiguration to operate with embodiments of the invention as the charging gateway implements communication protocols used by the charging servers.

Figure 1:
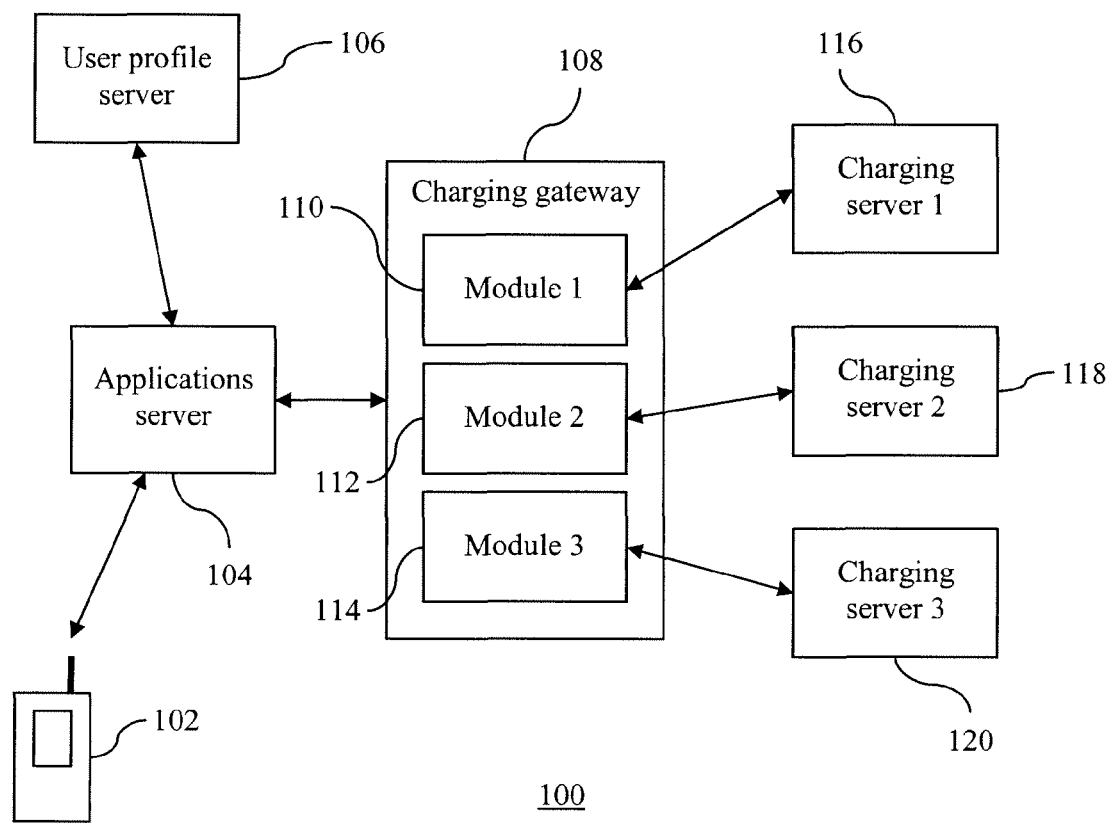
FIG. 1 shows an example of a system according to embodiments of the invention.

FIG. 1 shows an example of a system 100 according to embodiments of the invention. The system 100 includes a user agent 102. The user agent 102 is a device that is accessed by a user such that the user has access to and/or can use applications and services of the system 100 and can access content supplied by the applications. For example, the content and services may include one or more of voice calls, video calls, messaging, data services (for example internet browsing) and other services and/or content. The user agent 102 may comprise, for example, a mobile device such as a mobile telephone, PDA, laptop/notebook computer or the like. Alternatively, the user agent 102 may comprise another device such as, for example, a personal computer (PC). Embodiments of the invention are not dependent on the type of user agent 102 and the user agent 102 may comprise any device or devices capable of accessing applications and services such as those indicated above. The user agent 102 may comprise an application that is operated by a user on a device (such as a fixed or mobile device).

The system 100 also includes an applications server 104. The applications server 104 is a server on which applications are running or can be running. These applications can be accessed by the user agent 102 to provide content and/or services to the user agent 102. The applications server 104 may comprise, for example, a Telecom Applications Server (TAS). The TAS may comprise a computing system including an operating system, application server software (for example, JBoss) and applications.

The user agent 102 may communicate with the applications server 104 over a wired or wireless communications link, as appropriate. For example, where the user agent 102 is a mobile telephone and the applications server 104 is a TAS, the user agent 102 and applications server 104 may communicate, at least in part, over a mobile telephone communications link such as, for example, GSM, 3G and the like. In certain networks, such as internet protocol (IP) networks, a protocol such as SIP or H.323 may be used for communications between the user agent 102 and the applications server 104 (transfer of media may be done, for example, using Real-time Transport Protocol, RTP). In legacy networks, this protocol may be, for example, ISDN or ISUP for signalling and TDM for media transfer (for example, voice, messaging and data transmission), whereby communications flow between the user agent and a media server, for example, which is controlled by the applications server.

The applications server 104 may also communicate with a user profile server 106. The user profile server 106 may store a user profile associated with a user of the user agent 106. For example, a user profile may store one or more of the name, address, telephone number, subscription data (whether the user pays for services in advance or after usage), account status, presence status (whether or not the user is currently in a telephone conversation) and other information. The user profile server 106 may comprise, for example, a LDAP (Lightweight Directory Access Protocol) server in a corporate network, a Home Location Register (HLR) accessible using MAP (mobile application part) in a mobile telecommunications network, or a LDAP or SQL database or Home Subscriber Server (HSS) in IP networks.

The system 100 also includes a charging gateway 108. The charging gateway 108 includes a number of modules. The gateway 108 may include any number of modules, although three modules 110, 112 and 114 are shown. Each module may communicate with a respective charging server. For example, the first module 110 may communicate with a first charging server 116, the second module 112 may communicate with a second charging server 118, and the third module 114 may communicate with a third charging server 120. In embodiments of the invention, the modules comprise software modules that are running or can be running on the charging gateway 108 (which may comprise, for example, a server). Software modules may be added and/or removed, for example, without interrupting operation of the charging gateway and thus not interrupting the availability of content and/or services requested (or to be requested) by the user agent. In alternative embodiments of the invention, one, some or all of the modules may comprise other types of module, such as hardware modules, for example. Such a modular design may allow modules to be added or removed as and when required. This may be simpler than, for example, reprogramming a non-modular charging gateway. In other embodiments of the invention, however, a non-modular charging gateway may be used instead that selects and communicates with an appropriate charging server based on communications received from the application server 104.

Each module 110, 112 and 114 communicates with its respective charging server 116, 118 and 120 using a communication protocol that is used by the respective charging server. For example, the first charging server 116 may comprise an Online Charging System (OCS) charging server that uses the CCA (Credit Control Application) protocol (based on the Diameter protocol) for communications. Thus, the first module 110 in the charging gateway 108 may use the CCA protocol to communicate with the first charging server 116.

In another example, the second charging server 118 may comprise a SCP (Service Control Point) server that uses the CAP (CAMEL Application Part) protocol for communications. Thus, the second module 112 may use the CAP protocol to communicate with the second charging server 118.

In another example, the third charging server 120 may comprise a Prepaid Server (PPS) that communicates using the MBI (Message-Based Interface) protocol. Thus, the third module 114 may communicate with the third charging server 120 using the MBI protocol.

In embodiments of the invention, there may be any number of charging servers. Each charging server may communicate with a module in the charging gateway 108 using a respective communications protocol, although a protocol may be used by multiple charging servers. A module in the charging gateway 108 typically uses one protocol to communicate with one charging server, although in alternative embodiments a module may use more than one communications protocol and/or communicate with more than one charging server.

The applications server 104 may communicate with the charging gateway 108 using a single interface and protocol. The charging gateway 108 forwards appropriate information from the applications server 104 to the appropriate charging server using the appropriate module, and returns appropriate information in any reply from the charging gateway to the applications server 104 using the protocol for communications between the applications server 104 and the charging gateway 108. Therefore, communications between the applications server 104 and the appropriate charging gateway 116 are effected, whereby the applications server uses a single protocol for communications with the appropriate charging server, and this protocol is not dependent on the charging server. This is enabled by the presence of the charging gateway 108, which effectively translates communications from the applications server 104 into the appropriate charging server communication protocol for communicating with the appropriate charging server.

Thus, the appropriate charging server is identified. This may be done implicitly, for example if the application server 104 communicates with only one module in the charging gateway 108 then the charging server associated with the module is implicitly identified. Alternatively, this may be done explicitly, for example the charging server is identified (or the identification can be derived) from information in communications sent between the application server 104 and the charging gateway 108.

In embodiments of the invention, the modules 110, 112 and 114 are Java beans, i.e. small applications expressed in the Java programming language. The Java programming language is a well-known language. The charging gateway 108 may include appropriate software and/or hardware to enable execution of one or more of the Java beans. In such embodiments, the protocol between the applications server 104 and the charging gateway 108 may be the RMI (Remote Method Invocation) protocol, a remote procedure call protocol whereby one or more selected Java beans may be invoked by the applications server 104. For example, a Java bean that is not being executed may be executed by the charging gateway when it is required. Alternatively, a currently executing Java bean may be manipulated when required.

The application server may select one of the modules 110, 112 and 114 based on one or more of a number of factors. For example, information from the user profile server, such as the user's identity and/or the user's account status and information, and/or any other information such as the charging servers that are available and/or the application that is communicating with a charging server may be used by the application server for selecting which module 110, 112 and 114 to use for communicating with a charging server. In certain embodiments, a user is typically associated with one charging server, and thus when the user tries to use an application or service, the application server 104 may select the appropriate module in the charging gateway 108 to communicate with the associated charging server. Information identifying the appropriate module and/or charging server may be stored, for example, in the user profile server 106, for example in a user profile associated with the user. In some embodiments, for example, the single charging server associated with the user is a charging server associated with a network service provider of the user (or the user agent). The network service provider provides network services such that the user agent may be used to access content and/or services over the network.

Figure 2:
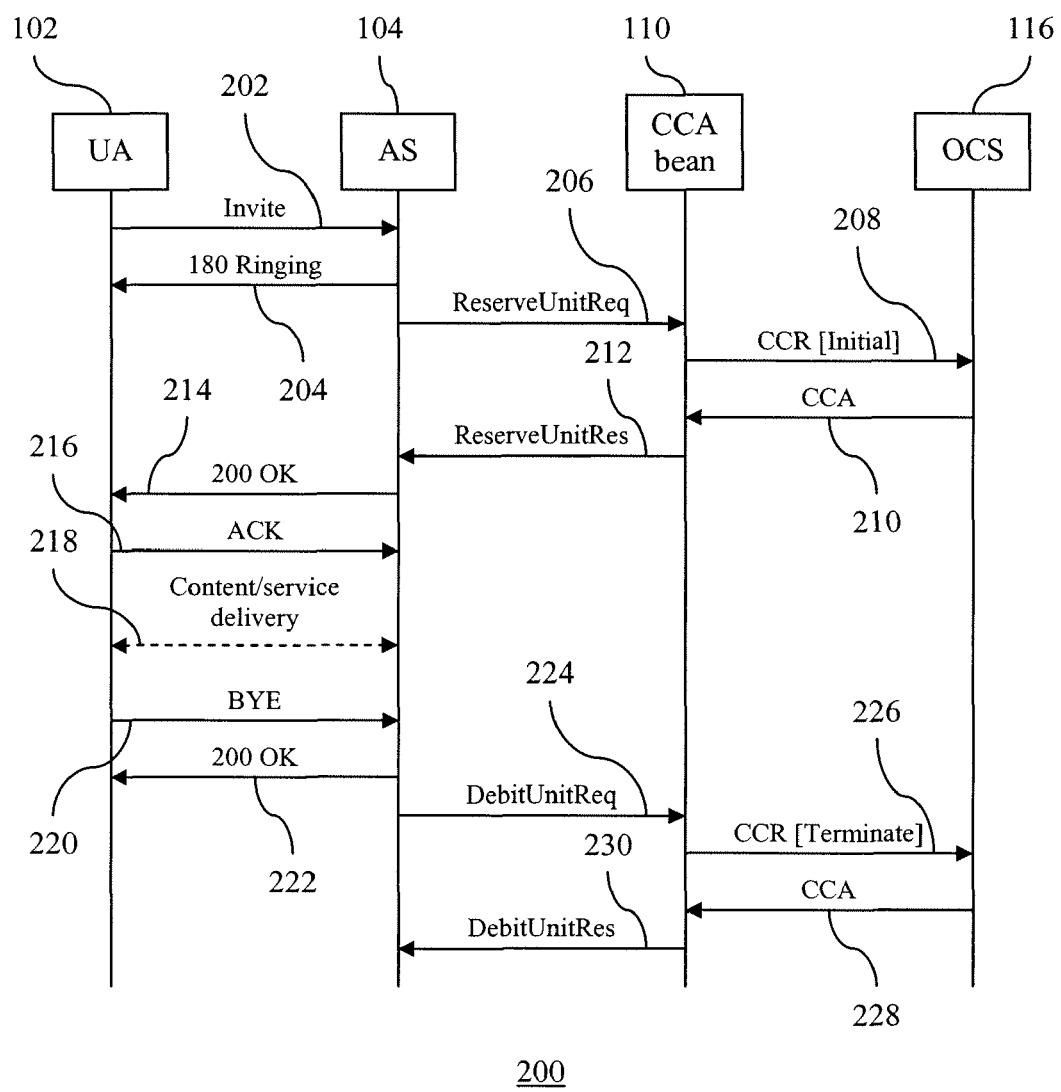
FIG. 2 shows an example of communications in the system according to embodiments of the invention.

FIG. 2 shows an example of communications between the user agent (UA) 102, applications server (AS) 104, first module 110 and first charging server 116. In this example, the first module 110 is a Java bean capable of communicating, using the Diameter CCA (Credit Control Application) protocol, with the first charging server 116 which is an OCS (Online Charging System) server. Communications between the UA 102 and the AS 104 in this example use SIP (Session Initiation Protocol). In this example, the user agent 102 is attempting to initiate a video call with another party (not shown) such as, for example, another user agent, a video portal or a video content delivery service.

The user agent 102 first sends a SIP invite 202 to the application server 104. The invite 202 is a service request that indicates that the user agent 102 is inviting another user or service to participate in a session (that is, a voice session, video session, messaging session, data session and the like), i.e. requesting a service, or requesting content (in this example, the session is a video call session). The invite 202 includes information indicating the content or service required by the user agent 102 (for example, where the user agent is requesting a session with another user agent, the invite 202 may identify the user agent, for example by indicating the called party's SIP URI. In reply, the application server 104 sends a SIP ringing communication 204 back to the user agent 102, indicating to the user agent 204 that the request for the content or service is being processed.

The application server 104 may at this point, if required, request information from the user profile server 106 (see FIG. 1) from which the appropriate module and/or charging server can be identified. The identified charging server is the server that can perform the appropriate authorization for the user to use the requested content or service and can perform charging and billing activities in relation to the content or service. The identified module is the module that can communicate with the appropriate charging server associated with the user agent or user.

The application server 104 then sends a ReserveUnitReq authorization request communication 206 to the identified first module 110 (i.e. the module that can communicate with the appropriate charging server). The ReserveUnitReq communication 206 includes sufficient information for the charging server to carry out authorization, charging and billing activities and as such may identify the user agent 102 (or the user using the user agent 102). In embodiments of the invention using the RMI protocol between the application server 104 and the charging gateway 108, the ReserveUnitReq authorization request also invokes the appropriate module (for example, causes the appropriate module to begin executing).

The first module 110 sends a Credit Control Request (CCR) [Initial] communication 208 to the first charging server 116. The CCR [Initial] request contains sufficient information for the charging server 116 to determine whether or not the user agent 102 should be allowed access to the requested content or service. This determination is indicated in the response 210 from the charging server 116 to the module 110, which comprises a Credit Control Answer (CCA) communication. The module 110 then sends a ReserveUnitRes authorization response communication 212 to the application server 104. The ReserveUnitRes communication 212 indicates whether or not the user agent is allowed to access the requested content or service, based on the CCA communication 210 from the charging server 116. The communication 212 may also, in embodiments of the invention, indicate an amount of service to be reserved, such as, for example, time, volume and/or amount of data.

If the user agent 102 is authorized by the charging server 116 to access the requested content or service, the application server 104 sends a SIP "200 OK" communication 214 to the user agent 102. The user agent 102 then sends a SIP ACK acknowledgement 216 to the application server 104. Delivery of the requested service or content is then effected between the user agent 102 and the application server 104 as indicated by the arrow 218 (or alternatively between the user agent 102 and a content server, not shown, which may be controlled by the application server 104). This may involve the user agent 102 and/or application server 104 communicating with third parties (not shown) depending on the requested content or service.

Once the content or service has been delivered, the user agent 102 sends a SIP BYE communication 220 to the application server 104 to terminate the content/service delivery. The application server 104 sends a SIP "200 OK" confirmation back to the user agent 102 in reply. The application server also sends a DebitUnitReq communication 224 to the module 110. This communication 224 indicates that provision of the content or service has finished, and that an appropriate charge should be applied to an account associated with the user agent 102 (or user using the user agent 102), for example debit of a monetary amount, usage allowance and the like. The module 110 sends a CCR [Terminate] communication 226 to the charging server 116 to indicate to the charging server 116 that the provision of the content or service is complete. The charging server sends a CCA communication 228 back to the module 110. This communication 228 may indicate information relating to the cost of the provision of the content or service to the user agent 102. Finally, a DebitUnitRes communication 230 is sent from the module 110 to the application server 104 to indicate to the application server 104 that charging and billing by the charging server 116 is complete (or, at least, the charging server is in possession of sufficient information to carry out the appropriate charging and billing). This communication may, in embodiments of the invention, include information relating to the cost of provision of the content or service.

In this way, charging and billing is effected by the charging server 116 while the application server 104 communicates with the charging gateway 108 (for example, communicates with the module 110 within the charging gateway 108) using only a specific predefined protocol that is not dependent on a protocol used by the charging server 116.

Figure 3:
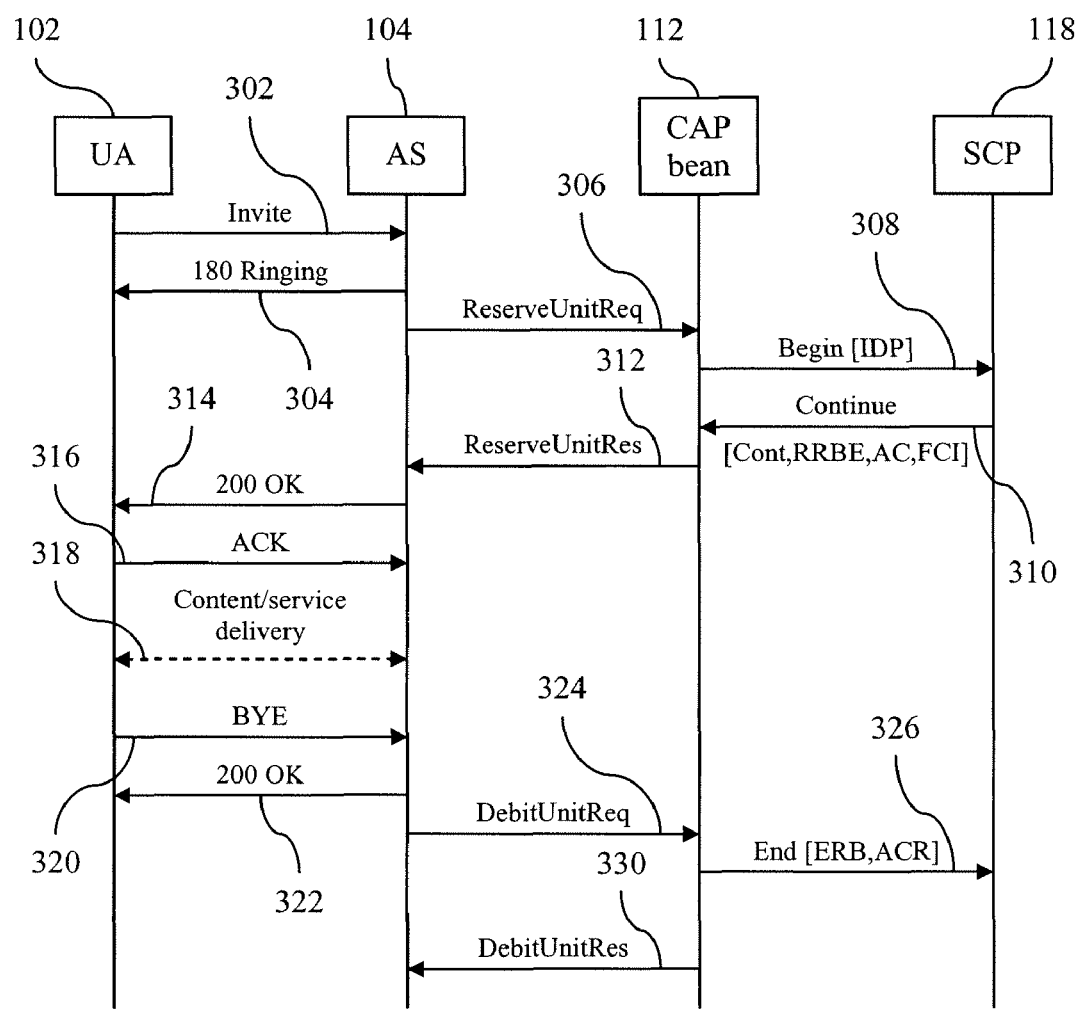
FIG. 3 shows an example of communications in the system according to embodiments of the invention.

FIG. 3 shows another example of communications 300 within the system 100. More specifically, FIG. 3 shows an example of communications 300 between the user agent (UA) 102, applications server (AS) 104, second module 112 and second charging server 118. In this example, the second module 112 is a Java bean capable of communicating, using the CAP (CAMEL Application Part) protocol, with the second charging server 118 which is a SCP (Service Control Point) server.

Communications 302-306, 312-324 and 330 are substantially identical to corresponding communications 202-206, 212-224 and 230 respectively as described above in respect of FIG. 2. The example shown in FIG. 3 is different to that shown in FIG. 2 as a different charging server is used and communications between the charging gateway 108 and the charging server use a different protocol, and so a different module is used for communications between the charging gateway 108 and the charging server.

Once the ReserveUnitReq communication 306 has been received by the module 112, a CAP protocol Begin [InitialDP] communication 308 is sent by the module 112 to the charging server 118. The communication 308 contains sufficient information for the charging server 118 to determine whether or not the user agent 102 is allowed access to the requested service or content. If the user agent is allowed access to the requested service or content, then the charging server 118 sends a Continue [Continue,RequestReportBCS-MEvent,ApplyCharging,FurnishChargingInformation] communication 310 to the module 112, and the module 112 sends a ReserveUnitRes communication 312 to the application server 104.

Once the module 112 has received the DebitUnitReq communication 324 from the application server 104, the module 112 sends an End [EventReportBCSM, ApplyChargingReport] communication 326 to the charging server 118, indicating that provision of the service or content has finished. The module 112 then sends a DebitUnitRes communication 330 back to the application server 104.

Figure 4:
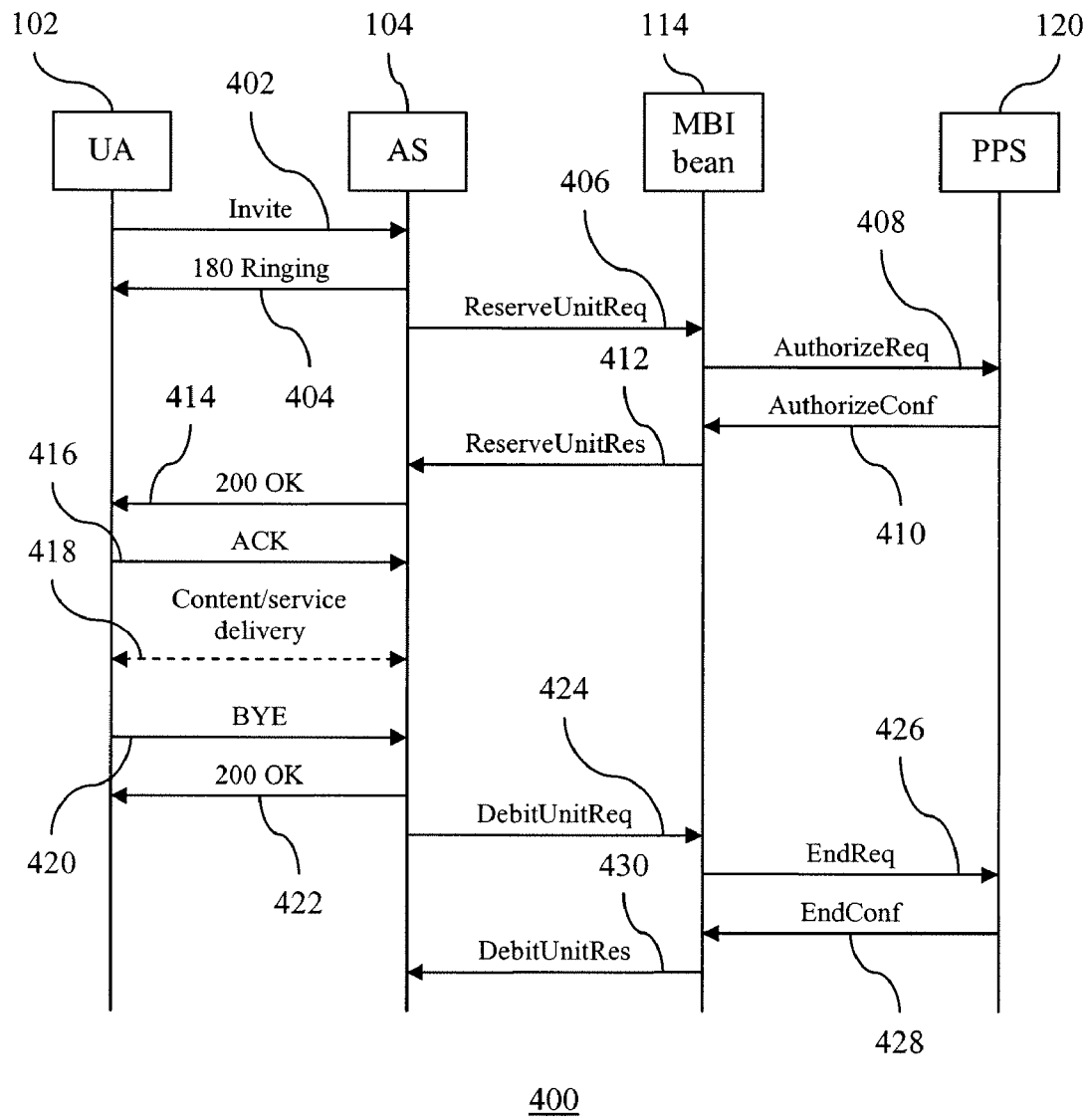
FIG. 4 shows an example of communications in the system according to embodiments of the invention.

FIG. 4 shows another example of communications 400 within the system 100. More specifically, FIG. 4 shows an example of communications 400 between the user agent (UA)

102, applications server (AS) 104, third module 114 and third charging server 120. In this example, the third module 114 is a Java bean capable of communicating, using the MBI (Message-Based Interface) protocol, with the third charging server 120 which is a PPS (Prepaid Server).

Communications 402-406, 412-424 and 430 are substantially identical to corresponding communications 202-206, 212-224 and 230 respectively as described above in respect of FIG. 2. The example shown in FIG. 4 is different to that shown in FIG. 2 as a different charging server is used and communications between the charging gateway 108 and the charging server use a different protocol, and so a different module is used for communications between the charging gateway 108 and the charging server.

Once the ReserveUnitReq communication 406 has been received by the module 114, the module 114 sends an AuthorizeReq communication 408 to the charging server 120 according to the MBI protocol. The communication 408 contains sufficient information for the charging server 120 to determine whether or not the user agent 102 is allowed access to the requested service or content. If the user agent 102 is allowed access to the requested service or content, then the charging server 120 sends an AuthorizeConf communication 410 to the module 114, and the module 114 sends a ReserveUnitRes communication 412 to the application server 104.

Once the module 114 has received the DebitUnitReq communication 424 from the application server 104, the module 114 sends an EndReq communication 426 to the charging server 120, indicating that provision of the service or content has finished. The charging server 120 replies to the module 114 with an EndConf message 428. The module 114 then sends a DebitUnitRes communication 430 back to the application server 104.

Figure 5:
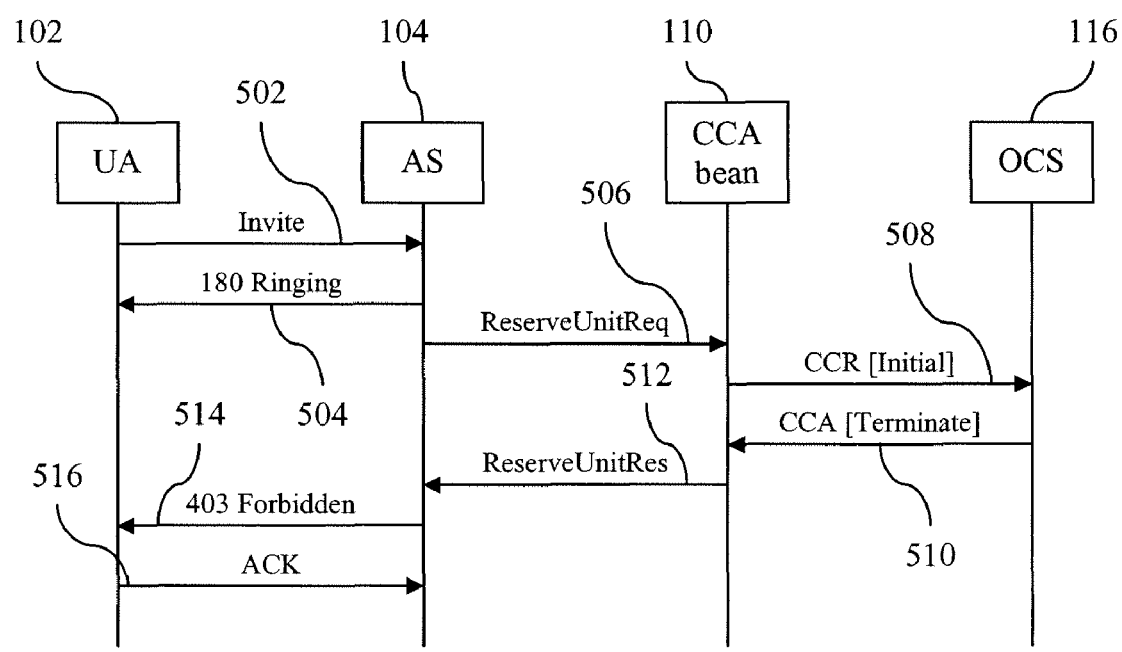
FIG. 5 shows an example of communications in the system according to embodiments of the invention where authorization to access the requested content or service is not given.

FIG. 5 shows an example of a case 500 where the appropriate charging server 116 does not authorize the user agent 102 (or user using the user agent 102) to access the requested content or service. Communications 502 to 508 are substantially identical to corresponding communications 202 to 208 shown in FIG. 2. However, when the charging server 116 receives the CCR [Initial] communication 508 from the CCA bean (module) 110, the charging server 116 determines that the user agent 102 (or user) is not authorized to access the requested content or service. Therefore, the charging server 116 returns a CCA [Terminate] communication 510 to the module 110 indicating that authorization has been refused. This is reflected in the subsequent ReserveUnitRes communication 512 from the module 110 to the application server 104. The application server 104 then returns a "403 Forbidden" SIP communication 514 to the user agent 102. The user agent 102 may return an acknowledgement to the application server 104. The user agent 102 thus knows that it is not authorized to access the requested content or service, and may take appropriate action (for example, by displaying an error message). Communications between the application server 104 and module 110 use the predetermined communication protocol that does not depend on the protocol used for communications between the module 110 and the charging server 116.

Figure 6:
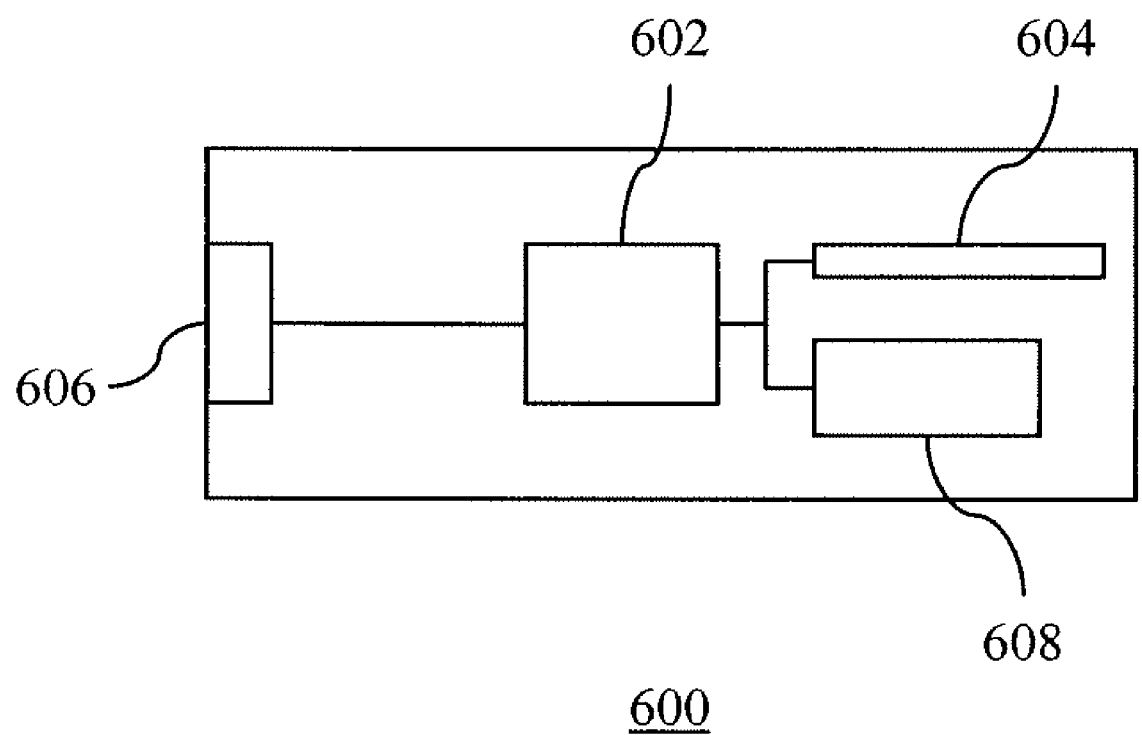
FIG. 6 shows an example of a computing system suitable for use with embodiments of the present invention.

FIG. 6 shows an example of a computing system 600 that may be used with embodiments of the invention. The computing system 600 comprises a data processor 602 and a main memory 604. The computing system 600 also includes at least one communications device 606 for communicating with networks and/or other systems and devices. The system 600 may also include a permanent storage device such as a hard disk 608. The system 600 may also include an input device (not shown) such as a mouse and/or keyboard, and/or a display device (not shown).

Where a server is indicated above, the server may comprise a physical device such as a computing system or may comprise multiple such computing systems. Alternatively, a server may comprise a virtual or logical server or an abstract concept whereby multiple "servers" are combined onto one or more physical devices.

Where communications between two entities are described, such as between two servers or between a user agent and a server, the communications may use one or more wired and/or wireless networks for transmission between the entities. Where the networks include wireless networks, one or more of a number of wireless technologies may be used, such as, for example, GSM, 3G, 802.11, WiMAX and/or other wireless technologies.

Multiple modules may be implemented within the charging gateway that are present for the purposes of redundancy and/or load balancing and sharing. For example, two or more modules serving the same purpose (communication using a particular protocol and/or with a particular charging server) may be implemented in the charging gateway such that if one module fails, another can be invoked, thus providing high availability. Additionally or alternatively, two or more modules may be implemented such that load may be balanced between the modules. For example where two modules are implemented on separate servers, where the combined servers comprise a single charging gateway, load may be balanced between the modules to balance the load between the servers.

Embodiments of the invention are suitable for use with both offline and online charging. For example, online charging is where charges are confirmed and effected in real-time with the appropriate charging server, whereas offline charging is where charges are confirmed in batches which are processed after the content or service has been deleted.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A system comprising:
a charging gateway comprising a generic interface to an applications server such that the applications server communicates with the charging gateway using a common protocol independent of a charging server being communicated with, including executable instructions to:
receive directly from a user agent, through the applications server, an authorization request;
identify a charging server associated with the authorization request from a plurality of charging servers implementing a plurality of charging server communication protocols based upon information contained in the authorization request, each of the plurality of charging servers associated with a respective one of the plurality of charging server communication protocols;
select an associated one of a plurality of modules included in the charging gateway based on the identified charging server;
translate, by the associated module selected, communications between the common protocol and the respective charging server communication protocol; and
communicate, using the respective charging server communication protocol, to obtain request information from the identified charging server.

2. A system as claimed in claim 1, wherein the executable instructions are configured such that a charging server is identified implicitly by communications received to the charging gateway from the applications server being for only one particular module.

3. A system as claimed in claim 2, wherein the executable instructions are configured such that the associated one of a plurality of modules is selected in the charging gateway by the applications server.

4. A system as claimed in claim 2, wherein each of the plurality of modules comprises a Java bean.

5. A system as claimed in claim 4, wherein the authorization request is provided in Remote Method Invocation.

6. A system comprising:
a charging gateway comprising a generic interface to an applications server such that the applications server communicates with the charging gateway using a common protocol independent of a charging server being communicated with, including executable instructions to:
receive directly from a user agent, through the applications server, a service request;
identify a particular charging server, from a plurality of charging servers implementing a plurality of charging server communication protocols, associated with at least one of the user agent and a user using the user agent, wherein the charging server is identified based upon information contained in the service request;
receive an authorization request at the charging gateway such that the charging gateway communicates with the identified charging server using a respective one of the plurality of charging server communication protocols associated with the identified charging server;
select a module associated with the identified particular charging server from modules included in the charging gateway; and
translate, by the associated module selected, communications between the common protocol and the respective charging server communication protocol,
wherein the respective charging server communication protocol is selected based upon information contained in the service request.

7. A system as claimed in claim 6, arranged to provide the authorization request to the associated module selected such that the associated module selected communicates with the identified charging server using the respective charging server communication protocol associated with the identified charging server.

8. A system as claimed in claim 7, wherein the modules comprise Java beans.

9. A system as claimed in claim 8, wherein the service request is provided in Remote Method Invocation.

10. A system as claimed in claim 6, arranged to receive an authorization response from the charging gateway.

11. A system as claimed in claim 10, arranged to selectively provide content or a service identified in the user request based on the authorization response.

12. A communication method comprising:
receiving, at a charging gateway, directly from a user agent, through an applications server, an authorization request;
identifying, by the charging gateway, a charging server associated with the authorization request from a plurality of charging servers implementing a plurality of charging server communication protocols based upon information contained in the authorization request, each charging server associated with a respective one of the plurality of charging server communication protocols;
selecting a module from among a plurality of modules included in the charging gateway based on the identified charging server;
translating, by the selected module, communications between a common protocol used between the applications server and the charging gateway and the respective charging server communication protocol; and
communicating, by the charging gateway, with the identified charging server using the respective charging server communication protocol, to obtain request information from the identified charging server.

13. A method as claimed in claim 12, wherein identifying the charging server comprises identifying the module associated with the identified respective charging server.

14. A method as claimed in claim 13, wherein communicating with the identified charging server comprises the identified module communicating with the identified charging server using the respective charging server communication protocol.

15. A method as claimed in claim 12, wherein the plurality of modules comprise a plurality of Java beans.

16. A system as claimed in claim 15, wherein the authorization request is provided in Remote Method Invocation.

17. A communication method comprising:
receiving, at a charging gateway, directly from a user agent, through an applications server, a service request;
identifying, by the charging gateway, a charging server, from a plurality of charging servers implementing a plurality of charging server communication protocols, associated with at least one of the user agent and a user using the user agent, wherein the charging server is identified based upon information contained in the service request;

receiving an authorization request at the charging gateway;

selecting a module from among a plurality of modules included in the charging gateway based on the identified charging server;

translating, by the selected module, communications between a common protocol used between the applications server and the charging gateway and a respective one of the charging server communication protocols associated with the identified charging server; and communicating, by the charging gateway, with the identified charging server using the respective charging server communication protocol associated with the identified charging server.

18. A method as claimed in claim 17, wherein charging server is identified implicitly by communications received to the charging gateway from the applications server being for only one module.

19. A method as claimed in claim 18, wherein the modules comprise Java beans.

20. A method as claimed in claim 19, wherein the service request is provided in Remote Method Invocation.

21. A method as claimed in claim 17, further comprising receiving an authorization response from the charging gateway.

22. A method as claimed in claim 21, further comprising selectively providing content or a service identified in the service request based on the authorization response.

23. A non-transitory computer-readable medium having computer-readable instructions stored thereon that, if executed by one or more processors cause the one or more processors to:

receive, at a charging gateway, directly from a user agent, through an applications server, an authorization request;

identify, by the charging gateway, a charging server associated with the authorization request from a plurality of charging servers implementing a plurality of charging server communication protocols based upon information contained in the authorization request, each charging server associated with a respective one of the plurality of charging server communication protocols used to communicate between the charging gateway and the identified charging server;

select a module from among a plurality of modules included in the charging gateway based on the identified charging server;

translate, by the selected module, communications between a common protocol used between the applications server and the charging gateway and the respective charging server communication protocol associated with the identified charging server; and communicate, using the respective charging server communication protocol associated with the identified charging server, to obtain request information from the identified charging server.

24. The non-transitory computer-readable medium as claimed in claim 23, wherein the computer-readable instructions to identify the charging server includes executable instructions to identify a module associated with the identified charging server.

25. The non-transitory computer-readable medium as claimed in claim 23, wherein the computer-readable instructions to communicate, by the identified module, with the identified charging server using the respective charging server communication protocol associated with the identified charging server.

* * * * *

UNITED STATES PATENT AND TRADEMARK OFFICE
CERTIFICATE OF CORRECTION

PATENT NO. : 8,219,449 B2
APPLICATION NO. : 12/270342
DATED : July 10, 2012
INVENTOR(S) : Olivier Bertin et al.

It is certified that error appears in the above-identified patent and that said Letters Patent is hereby corrected as shown below:

In column 10, line 61, in Claim 16, delete "system" and insert -- method --, therefor.

In column 11, line 19, in Claim 18, after "wherein" insert -- the --.

Signed and Sealed this
Twenty-sixth Day of February, 2013

Teresa Stanek Rea
*Acting Director of the United States Patent and Trademark Office*